United States Patent
Brendel et al.

(10) Patent No.: US 11,958,979 B2
(45) Date of Patent: *Apr. 16, 2024

(54) RADAR FREQUENCY TRANSPARENT EFFECT PIGMENT MIXTURE, FORMULATIONS AND COATINGS THEREOF

(71) Applicant: ECKART GMBH, Hartenstein (DE)

(72) Inventors: Carolin Brendel, Nuremberg (DE); Klaus Greiwe, Lauf (DE); Robert Maul, Burgthann (DE); Oliver Bedford, Eckental (DE); Gunter Kaupp, Neuhaus/Pegnitz (DE)

(73) Assignee: Eckart GmbH, Hartenstein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,553

(22) Filed: Jul. 5, 2022

(65) Prior Publication Data

US 2022/0363907 A1    Nov. 17, 2022

Related U.S. Application Data

(63) Continuation of application No. 17/602,475, filed as application No. PCT/EP2020/060140 on Apr. 9, 2020, now Pat. No. 11,421,111.

(30) Foreign Application Priority Data

Apr. 12, 2019 (EP) ..................................... 19169122

(51) Int. Cl.
*C09C 1/00* (2006.01)
*C09C 1/40* (2006.01)

(52) U.S. Cl.
CPC .............. *C09C 1/0021* (2013.01); *C09C 1/40* (2013.01); *C01P 2006/62* (2013.01); *C09C 2200/1004* (2013.01); *C09C 2200/1058* (2013.01); *C09C 2200/505* (2013.01)

(58) Field of Classification Search
CPC . C09C 1/0021; C09C 1/40; C09C 2200/1004; C09C 2200/1058; C09C 2200/505; C01P 2006/62
See application file for complete search history.

(56) References Cited

U.S. PATENT DOCUMENTS

| | | | | |
|---|---|---|---|---|
| 4,623,396 A | ‡ | 11/1986 | Kimura | ................. C09C 1/0021 106/417 |
| 4,867,793 A | ‡ | 9/1989 | Franz | .................... A61K 8/0254 106/456 |
| 5,277,711 A | | 1/1994 | Schmidt | |

(Continued)

FOREIGN PATENT DOCUMENTS

| | | | | |
|---|---|---|---|---|
| CN | 102741358 A | ‡ | 10/2012 | ........... C09C 1/0024 |
| CN | 103459515 A | ‡ | 12/2013 | ........... A61K 8/0254 |

(Continued)

OTHER PUBLICATIONS

International Search Report and Written Opinion for International Application No. PCT/EP2020/060140, dated Jul. 14, 2020 (10 pages).‡
4898 Iriodin® 600 Black Mica, Jan. 2007.
ALPLATE 770 NS Technical Data Sheet, Sep. 26, 2011.
Color Proposals 1997 /1998: New Iriodin®/ Afflair® pigments.
Color Proposals 1997/1998: Crystalline Greys.
Color Proposals 1997/1998: Shimmering Purples.
E. Emilsson, Diploma Work, Radar Transparency and Paint Compatibility, A Study of Automobile Bumper and Bumper-Skin Complex Permittivities for 77GHz Microwaves, 2017.

(Continued)

*Primary Examiner* — James A Fiorito
*Assistant Examiner* — Ross J Christie
(74) *Attorney, Agent, or Firm* — Fitch, Even, Tabin & Flannery LLP

(57) ABSTRACT

This invention deals with effect pigment mixture comprising platelet-like aluminum effect pigments obtained by grinding of aluminum or aluminum based alloy shot and silvery pearlescent pigments, wherein the silvery pearlescent pigments are taken from the group consisting of: a) pearlescent pigments comprising a transparent substrate which is coated with a high-refractive index layer with n>1.8, which comprises or consists of an iron-oxide with Fe(II)-ions, b) pearlescent pigments comprising a transparent substrate which is coated with a high-refractive index layer with n>1.8, which comprises or consists of titanium suboxide or a pearlescent pigment comprising a substrate with a high-refractive index with n>1.8 layer, which comprises or consists of a titanium suboxide that is optionally coated with a high-refractive index layer with n>1.8, c) pearlescent pigments comprising a transparent substrate which is coated with a high-refractive index layer with n>1.8, which comprises or consists of titanium oxynitride, d) pearlescent pigments comprising a transparent substrate which is coated with a layer comprising carbon, wherein the carbon is enclosed in a particulate form in another metal oxide layer or is formed as a separate, individual layer, e) a transparent substrate coated with a first layer comprising or consisting of a mixture of the oxides of titanium, iron and at least one of cobalt and chromium and a second layer on the first layer, wherein the second layer comprises an oxide of titanium, and mixtures or combinations of the pearlescent pigments a) to e) or pearlescent pigments with mixtures or combinations of the various coating layers mentioned in the pearlescent pigments a) to e), wherein the weight ratio of the pearlescent pigment to the aluminum effect pigment is in a range of 0.4 to 5.0. The invention deals also with a coating formulation containing this effect pigment mixture.

15 Claims, No Drawings

(56) References Cited

U.S. PATENT DOCUMENTS

| | | | | |
|---|---|---|---|---|
| 5,702,519 | A | 12/1997 | Nitta | |
| 6,290,766 | B1 ‡ | 9/2001 | DeLuca, Jr. | C09C 1/0015 106/440 |
| 6,361,593 | B2 ‡ | 3/2002 | DeLuca, Jr. | C09C 1/0015 106/440 |
| 7,172,812 | B2 ‡ | 2/2007 | Greiwe | C09C 1/0015 428/407 |
| 7,611,574 | B2 ‡ | 11/2009 | Kniess | C09C 1/0066 428/404 |
| 8,552,070 | B2 * | 10/2013 | Albrecht | C09D 5/36 524/559 |
| 8,846,194 | B2 ‡ | 9/2014 | Maruoka | C09D 5/36 428/324 |
| 8,906,154 | B2 ‡ | 12/2014 | Hollman | C09D 5/36 106/456 |
| 9,624,378 | B2 ‡ | 4/2017 | Hippmann | C09C 3/063 |
| 10,240,045 | B2 ‡ | 3/2019 | Rueger | C04B 35/62805 |
| 11,421,111 | B2 * | 8/2022 | Brendel | C09C 1/0021 |
| 2003/0177950 | A1 | 9/2003 | Schoen | |
| 2007/0028799 | A1 | 2/2007 | Kniess | |
| 2010/0022696 | A1 * | 1/2010 | Maruoka | C09D 5/36 524/441 |
| 2011/0237683 | A1 ‡ | 9/2011 | Schmid | C09C 1/0081 524/441 |
| 2012/0301521 | A1 | 11/2012 | Gruner | |
| 2014/0010772 | A1 ‡ | 1/2014 | Gruner | A61Q 19/00 514/769 |
| 2014/0018439 | A1 | 1/2014 | Gruner | |
| 2014/0322534 | A1 * | 10/2014 | Suzuki | C09C 1/0051 423/625 |
| 2017/0130054 | A1 ‡ | 5/2017 | Dietz | C09D 5/36 |
| 2017/0321057 | A1 | 11/2017 | Rueger | |
| 2019/0338135 | A1 * | 11/2019 | Hamm | C09C 3/043 |

FOREIGN PATENT DOCUMENTS

| | | | | |
|---|---|---|---|---|
| CN | 108289404 | A ‡ | 7/2018 | |
| CN | 109486172 | A ‡ | 3/2019 | |
| CN | 109679412 | A ‡ | 4/2019 | C09D 101/12 |
| DE | 3617430 | A1 ‡ | 11/1987 | |
| DE | 4227082 | | 2/1994 | |
| DE | 4227082 | A1 ‡ | 2/1994 | A61K 8/0245 |
| DE | 4418215 | A1 ‡ | 11/1995 | C09D 5/30 |
| DE | 10331903 | A1 ‡ | 2/2004 | C09C 1/0015 |
| DE | 102009029763 | A1 ‡ | 12/2010 | H01Q 1/42 |
| DE | 102014003975 | A ‡ | 10/2015 | |
| EP | 0046851 | | 3/1982 | |
| EP | 0246523 | A2 ‡ | 11/1987 | |
| EP | 0332071 | | 9/1989 | |
| EP | 0332071 | A1 ‡ | 9/1989 | |
| EP | 0246523 | | 1/1991 | |
| EP | 0632109 | A1 ‡ | 1/1995 | |
| EP | 0681009 | | 11/1995 | |
| EP | 0681009 | A2 ‡ | 11/1995 | |
| EP | 0735115 | | 10/1996 | |
| EP | 0735115 | A1 ‡ | 10/1996 | |
| EP | 0842229 | | 5/1998 | |
| EP | 1013724 | | 6/2000 | |
| EP | 0842229 | B1 ‡ | 3/2002 | |
| EP | 0888410 | B1 ‡ | 4/2002 | |
| EP | 1620511 | A2 ‡ | 2/2006 | C09C 1/0015 |
| EP | 1727864 | B1 ‡ | 7/2007 | C09C 1/0015 |
| EP | 1682622 | B1 ‡ | 8/2007 | C09C 1/0015 |
| EP | 1084198 | B2 ‡ | 6/2008 | C09C 1/0015 |
| EP | 2502966 | A1 ‡ | 9/2012 | A61K 8/0254 |
| EP | 2598254 | B1 ‡ | 6/2013 | B05D 5/06 |
| EP | 2799398 | A2 * | 11/2014 | C01F 7/02 |
| EP | 2691478 | B1 ‡ | 7/2016 | A61K 8/0258 |
| EP | 3119840 | A1 ‡ | 1/2017 | A61K 8/0262 |
| EP | 2904052 | B1 ‡ | 7/2017 | C09C 1/0015 |
| EP | 3211043 | | 8/2017 | |
| EP | 3080209 | B1 ‡ | 10/2017 | C09C 1/62 |
| EP | 3230384 | A1 ‡ | 10/2017 | B05D 7/24 |
| EP | 3733802 | | 11/2020 | |
| JP | H05279604 | | 10/1993 | |
| JP | 2001164191 | | 6/2001 | |
| JP | 2004244516 | | 9/2004 | |
| JP | 2004244516 | A ‡ | 9/2004 | |
| JP | 2004271467 | | 9/2004 | |
| JP | 2004358329 | | 12/2004 | |
| JP | 2005075941 | A ‡ | 3/2005 | |
| JP | 2006282886 | A ‡ | 10/2006 | |
| JP | 2009102626 | A ‡ | 5/2009 | C08J 7/047 |
| JP | 2015105372 | A ‡ | 6/2015 | |
| JP | 2016221473 | A ‡ | 12/2016 | |
| KR | 20100136995 | A ‡ | 12/2010 | |
| WO | 1997043348 | | 11/1997 | |
| WO | WO-1997043348 | A1 ‡ | 11/1997 | |
| WO | 03014228 | | 2/2003 | |
| WO | WO-2004099319 | A2 ‡ | 11/2004 | C09C 1/0015 |
| WO | WO-2005111152 | A1 * | 11/2005 | B82Y 30/00 |
| WO | WO-2009083165 | A1 ‡ | 7/2009 | H01Q 1/3283 |
| WO | 2012130776 | | 10/2012 | |
| WO | WO-2012130776 | A1 ‡ | 10/2012 | A61K 8/0254 |
| WO | 2016091355 | | 6/2016 | |
| WO | WO-2018105644 | A1 ‡ | 6/2018 | B29C 45/16 |
| WO | WO-2018212491 | A1 ‡ | 11/2018 | B29C 45/14688 |

OTHER PUBLICATIONS

ECKART GmbH & Co. KG, Technical Data Sheet, Aluminum Paste STAPA Hydrolux 8154, Nov. 2003.

ECKART GmbH & Co. KG, Technical Data Sheet, STAPA Hydrolux 2156 Aluminum Paste, Mar. 21, 2018.

ECKART, Brochure for Metal and Effect Pigments, Mar. 2012.

ECKART, Paste Automovtive Captures from the Eckart.net webpage of products, 2007 and 2011.

ECKART, Syncrystal Captures from the Eckart.net webpage of products, May 25, 2018.

Excerpt of PPG's IT system describing the use of the automotive finishing varnish color with Audi's color code X7X in 2005-2015.

Excerpt of PPG's IT system relating to the production of a batch with No. WTC 874765 of the "Saharasilber Metallic" automotive color varnish of Jun. 21, 2013.

High Performance Pigments, Edited by Hugh M. Smith, 2002.

Ilmenite—National Gem Lab, retrieved Jul. 31, 2023.

J. Lodén, Master Thesis, Radar Transparency and Paint Compatibility, Jun. 22, 2017.

Merck, Brochure for The car's new lustre distinguished from steel blue to silver grey, Iriodin 9605 Blue-shade Silver SW, date unknown.

Merck, Brochure for "The car's new lustre distinguished from steel grey to noble silver, Iriodin 9602 Silvergrey WR II, Iriodin 9602 Silvergrey Fine Satin WR II," Aug. 11, 1993.

Merck, Color Proposals for Automotive Coatings, 2004/2005.

Merck, Color Proposals, Iridoin WR Pearl Lustre Pigments for Automotive Coatings, May 29, 1995.

Merck, Suppliers data, Specification Iriodin 9235 Rutile Green Pearl SW, Dec. 30, 2021.

Merck, Techno Color Proposals for Technical Coatings, 2003.

Opposition filed by Merck Patent GmbH in European Application No. 20720380.3 on Aug. 14, 2023.

Opposition filed by PPG Industries, Inc. in European Application No. 20720380.3 on Aug. 14, 2023.

Payment advice of Audi AG relating to PPG's invoice with No. 320370 from Dec. 12, 2013.

Photographs from PPG's official color fan deck from 2008.

PPG Industries, GPS Data for PA-75-3506, Stapa Hydrolux 156, May 4, 2009.

PPG Invoice dated Nov. 11, 2013.

Shipment documentation of part of the WTC 874765 batch from PPG Deutschland to Audi AG, Apr. 11, 2013.

Sparkle Silver 7005-AR Product Description, date unknown.

Sun Chemicals Colors & Effects GmbH, Suppliers data sheet of "Mearlin Exterior CFS Super Blue 6303Z", date unknown.

(56) References Cited

OTHER PUBLICATIONS

The car's new look dynamic from steel blue to silver gray, Iriodin 9605 Blue-shade Silver SW, date unknown.
Use of car model varnish colors in 2009/2010 by Audi.

* cited by examiner
‡ imported from a related application

RADAR FREQUENCY TRANSPARENT EFFECT PIGMENT MIXTURE, FORMULATIONS AND COATINGS THEREOF

RELATED APPLICATIONS

This application is a continuation of U.S. application Ser. No. 17/602,475, filed Oct. 8, 2021, which is a National Stage Entry of PCT/EP2020/060140, filed Apr. 9, 2020, the contents of which are incorporated herein by their entireties.

The present invention relates to an effect pigment mixture ensuring metallic appearance and a sufficient radio wave transmission to be used in radio transparent coatings. The invention also deals with coating formulations containing this effect pigment mixture to be used as radio transparent coatings.

Today it is common standard for most automotive base coats to include effect pigments such as metallic or pearlescent pigments. These platelet-like pigments orient in a parallel manner with respect to the coating substrate. In case of metallic platelets the act as little mirrors leading to high metallic gloss, flop effects (change of the lightness when viewed under different angles of incidence of observance) combined with an outstanding hiding power. In most cases the metallic pigments are aluminium pigments giving rise to silver-colored metallic coatings. In case of pearlescent pigments interference colors are produced and the coatings exhibit optical depth.

Since at least a decade also the plastic parts like automotive car bumpers are painted with essentially the same effect pigments in order to create a uniform high class optical appearance to the observer. It is hardly foreseeable that these standards will be reduced in the future. Nowadays the thicknesses of such dried coatings are in most cases below 15 µm as otherwise the costs are too high. Furthermore, such coatings must withstand high mechanical impact as provided. Adhesion tests have to be passed like, for example, the cross-cut test according to EN ISO 6270-2:2005 or the Karcher test.

For improving automotive safety, radar devices that measure distances and warn the driver if the automobile comes close to a nearby object has become a new standard. Such radar devices may be provided at various parts of the automobile, for example, behind the radiator grill, the back panel and the like. The development of cars driving autonomously will further increase the need of having various radar sensitive sensors. For future cars about 80 sensors may be installed in a car which measure distances and velocities of other objects in all directions. With increasing demand of radar sensors the will be a desire to hide these sensors by placing them beneath the bumper, for example, for not disturbing the visual appearance of the car.

However, it is well known that a coating containing the metallic effect pigments such as aluminium do exhibit a too strong damping of the radar waves. Radar waves used for sensors typically lie in the frequency band of 65 to 85 GHz, which corresponds to a wavelength range of about 4 to 5 mm. Although these wavelengths are much larger than the size of the effect pigments or the thickness of the coating a damping is induced by the aluminium pigments which exhibit a very high electrical conductivity in their interior. The aluminium pigments can act as sort of an antenna and a counter electromagnetic wave is induced leading to the attenuation effect. It is desired that the attenuation must be below 3 dezibel, preferably below 2 dezibel of the initial radar intensity when measured under perpendicular angle of incidence.

Pearlescent effect pigments are non-conductive and are known not to damp the radar electromagnetic waves (JP 2004244516 A).

In JP 2009102626 A is was proposed to coat a non-conductive substrate such like a glass flake with an alloy of silver and nobel metals such as gold or palladium. These pigments should have a low attenuation of radio frequency electromagnetic waves. Such pigments would be much too expensive to substitute existing aluminium pigments.

DE 102009029763 A1 discloses a plastic component for a car body which preferably contains two base coatings, wherein the first coating contains fine metallic effect pigments and the second coating contains coarse metallic effect pigments. Such two-fold coating structure will be too expensive.

In US 2010/0022696 A1 a mixture of metallic effect pigments and of pearlescent pigments based on $TiO_2$ coated mica substrates or a mixture of metallic effect pigments with glass flakes were disclosed which exhibited acceptable attenuation characteristics, when the metallic pigments had certain average distances between themselves. However, it is not disclosed whether the optical properties of resulting coated films are close to pure metallic coatings. Furthermore, demands of modern coatings are not fulfilled.

It is an object of the present invention to provide effect pigments which can be used for coatings which have substantially the same optical properties with respect to gloss, flop and hiding-power of existing metallic coatings and have an acceptable radar attenuation. Furthermore, the thicknesses of such coatings should not exceed more than 10% of the present common thicknesses and which meet the demands in mechanical stability.

A further object is to provide suitable coating formulations.

Furthermore, the effect pigments should be preferably employed in water-based coating formulations.

A further object is to provide a radio wave transparent coated film, preferably on a plastic substrate with the above mentioned properties.

The object is solved by providing an effect pigment mixture comprising platelet-like aluminum effect pigments obtained by grinding of aluminum or aluminum based alloy shot and silvery pearlescent pigments, wherein the silvery pearlescent pigments are taken from the group consisting of:

a) pearlescent pigments comprising a transparent substrate which is coated with a high-refractive index layer with n>1.8, which comprises or consists of an iron-oxide with Fe(II)-ions, b) pearlescent pigments comprising a transparent substrate which is coated with a high-refractive index layer with n>1.8, which comprises or consists of titanium suboxide or a pearlescent pigment comprising a substrate with a high-refractive index with n>1.8 layer, which comprises or consists of a titanium suboxide that is optionally coated with a high-refractive index layer with n>1.8, c) pearlescent pigments comprising a transparent substrate which is coated with a high-refractive index layer with n>1.8, which comprises or consists of titanium oxynitride, d) pearlescent pigments comprising a transparent substrate which is coated with a layer comprising carbon, wherein the carbon is enclosed in a particulate form in another metal oxide layer or is formed as a separate, individual layer, e) a transparent substrate coated with a first layer comprising or consisting of a mixture or the oxides of titanium, iron and at least one of cobalt and chromium and a second layer on the first layer, wherein the second layer comprises an oxide of titanium, and mixtures or combinations of the pearlescent pigments a) to e) or pearlescent pigments with mixtures or combinations of the various coating layers mentioned in the pearlescent pigments a) to e), wherein the weight ratio of the pearlescent pigment to the aluminum effect pigment is in a range of 0.4 to 5.0.

Further preferred embodiments of this effect pigment mixture are disclosed in claims 2 to 12.

The object of the invention is further provided by a coating formulation which contains the effect pigment mixture (claim 13).

DETAILED DESCRIPTION

Aluminum Effect Pigments:

The platelet-like aluminum effect pigments are obtained by grinding of aluminum or aluminum based alloy shot. The grinding step is typically made in ball mills according to the well-known Hall process using a solvent like white spirit, solvent naphta or isopropanol and as grinding aids fatty acids such as palmitinic acid, stearic acid, oleic acid or mixtures thereof.

The particle size distribution is measured by laser scattering granulometry using a Helos/BR Multirange (Sympatec) apparatus according to the manufacturer indications and in accordance to ISO 13320-1. The aluminum effect pigments are dissolved in isopropanol under stirring before measuring the particle size distribution. The particle size function is calculated in the Fraunhofer-approximation as a volume weighted cumulative frequency distribution of equivalent spheres. The median value $d_{50}$ means that 50% of the measured particles are below this value (in a volume-averaged distribution). The value $d_{90}$ means that 90% of the measured particles are below this value (in a volume-averaged distribution) and is an indication of coarse particles in the size distribution.

The platelet-like aluminum effect pigments preferably have a $d_{50}$ in a range of 9 to 30 μm and more preferably in a range of 12-27 μm. Below a $d_{50}$ of 9 μm the metallic appearance, especially the flop is too low. Above 30 μm the structure of the coating layer including the aluminum pigments becomes visible to the observer. Especially in automotive coatings this is an undesirable effect.

Preferably, the platelet-like aluminum effect pigments have a $d_{90}$ in a range of 18 to 45 μm and more preferably in a range of 20 to 42 μm. Above a $d_{90}$ of 45 μm some restrictions may occur with respect to sieving specifications of coating companies.

In further embodiments, the platelet-like aluminum effect pigments of the effect pigment mixture comprises a mixture of finer and of coarser aluminum effect pigments. The "finer" aluminum effect pigments add a better hiding power while the "coarser" aluminum effect pigments contribute to a high flop and brilliance. The finer aluminum effect pigments of such a mixture typically have a $d_{50}$ in a range of 9 to 13 μm and the coarser aluminum effect pigments typically have a $d_{50}$ in a range of 18 to 26 μm. Of course, the characteristic values of $d_{50}$ or $d_{90}$ of the total size distribution of such a mixture changes according to the characteristics of the two individual size distributions and the proportion of the two aluminum effect pigments. Bimodal particle size distributions may be possible in this case.

The mean thickness has been calculated from size measurements made with a Sysmex 3000S (FPIA) apparatus. Here a controlled flow of dispersed pigment particles is initiated through a flow measuring cell. The platelet-like particles are oriented parallel to a window suitable to optical measurements. All particles are "photographed" via a CCD camera and the areas of all particles are determined. In a simple model the aluminum pigments have a known mass $m_p$ weighted in and a known density p of 2.5 g/cm³ for aluminum flakes and all measured areas of the particles can be added to a total area (in μm²):

$$A = \Sigma_i A_i \quad (I)$$

The mean thickness $h_m$ in nm than calculates to the formula:

$$h_m = \frac{m_p 10{,}000}{\rho A} \quad (II)$$

This thickness $h_m$ is an area weighted thickness. The platelet-like aluminum effect pigments preferably have a mean thickness $h_m$ in a range of 80 to 500 nm and more preferably in a range of 140 to 400 nm.

Below 80 nm the aluminum pigments become too thin a disorientation by the pearlescent pigments of the effect pigment mixture or of additional pearlescent pigments may occur.

Above 500 nm the hiding power of the metallic effect pigments is too low.

In preferred embodiments the platelet-like aluminum effect pigment is coated with an anticorrosive coating consisting of adsorbed additives based on phosphonic acids or on phosphoric esters, a metal oxide, a polymer or mixtures or combinations thereof. Such passivated aluminum pigments are used in waterborne coatings to prevent the degradation of the aluminum flakes by attack of water under formation of hydrogen gas.

However, surprisingly it was found that a passivation coating can also decrease the unwanted attenuation of radio waves. Therefore, when using such passivated aluminum pigments with suitable pearlescent pigments a synergetic effect evolve regarding the decrease of the attenuation of radio waves.

It is most preferred that the passivation coating is a metal oxide. A "metal oxide" in this case can mean a pure metal oxide but also includes a metal hydroxide or a metal oxide hydrate or any mixture thereof. Preferably, the metal oxide is selected from the group consisting of $SiO_2$, Ce-oxide, Mo-oxide, V-oxide, Cr-oxide and mixtures or combinations thereof. With combinations it is meant the order in which the metal oxides are coated onto the aluminum substrate. Most preferred are $SiO_2$, Mo-oxide and any mixture or combination thereof and very preferred is $SiO_2$.

Examples of such commercially available aluminum pigments are Hydrolan® (Eckert GmbH), or Emeral® (Toyo Aluminium K.K., Japan).

The passivating coating does not or only very slightly alter the optical properties of the aluminum effect pigment. Particularly, it does not add any color the silvery aluminum effect pigment.

In all embodiments where the passivating layer is formed by a metal oxide coating, the outermost metal oxide coating is preferably further modified by an organofunctional silane, aluminate, titanate or zirconate and most preferably by an organofunctional silane. These so-called "coupling agents" enable to form a chemical bonding to a binder of a varnish or a paint on one side and to connect chemically to the metal effect pigment's surface. These organofunctional groups can also be called coupling groups or functional binding groups and are preferably selected from the group consisting of hydroxyl, amino, acryl, methacryl, vinyl, epoxy, isocyanate, cyano and mixtures thereof.

The organofunctional silanes, preferably used as coupling agents, which contain suitable functional groups are available commercially and are produced for example by Evonik and sold under the trade name "Dynasylan". Other products can be obtained from Morrientive (Silquest silanes) or from Wacker, for example standard silanes from the GENIOSIL product group.

Examples of these organofunctional silanes are 3-methacryloxypropyltrimethoxysilane (Dynasylan MEMO, Silquest A-174NT), vinyltri(m)ethoxysilane (Dynasylan VTMO and VTEO respectively, Silquest A-151 and A-171 respectively), methyltri(m)ethoxysilane (Dynasylan MTMS and MTES respectively), 3-mercaptopropyltrimethoxysilane (Dynasylan MTMO; Silquest A-189), 3-glycidoxypropyltrimethoxysilane (Dynasylan GLYMO, Silquest A-187), tris[3-(trimethoxysilyl)propyl]isocyanurate (Silquest Y-11597), bis[3-(triethoxysilyl)propyl]tetrasulfide (Silquest A-1289), bis[3-(triethoxysilyl)propyldisulfide (Silquest A-1589), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloxymethyltri(m)ethoxysilane (GENIOSIL XL 33, XL 36), (methacryloxymethyl)(m)ethyldimethoxysilane (GENIOSIL XL 32, XL 34), (isocyanatomethyl)methyldimethoxysilane, (isocyanatomethyl)trimethoxysilane, 3-(triethoxysilyl)propyl succinic anhydride (GEN10SIL GF 20), (methacryloxymethyl)methyldiethoxysilane, 2-acryloxyethylmethyldimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropxysilane, 3-methacryloxypropyltriethoxisilane, 3-methacryloxypropyltriacetoxysilane, 3-methacyloxypropylmethyldimethoxysilane, vinyltrichlorosilane, vinyltrimethoxysilane (GENIOSIL XL 10), vinyltris(2-methoxyethoxy)silane (GENIOSIL GF 58), vinyltriacetoxysilane or mixtures thereof.

The following are preferably used as organofunctional silanes: 3-methacryloxypropyltrimethoxysilane (Dynasylan MEMO, Silquest A-174NT), vinyltri(m)ethoxysilane (Dynasylan VTMO and VTEO respectively, Silquest A-151 and A-171 respectively), methyltri(m)ethoxysilane (Dynasylan MTMS and MTES respectively), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methactyloxymethyltri(m)ethoxysilane (GENIOSIL XL 33, XL 36), (methacryloxymethyl)(m)ethyldimethoxysilane (GENIOSIL XL 32, XL 34), 3-(triethoxysilyl)propyl succinic anhydride (GENIOSIL GF 20), vinyltrimethoxysilane (GENIOSIL XL 10) and/or vinyltris(2-methoxyethoxy)silane (GENIOSIL GF 58).

Furthermore, aqueous prehydrolyzates, for example available commercially from Evonik, can be used. These include, inter alia, aqueous aminosiloxane (Dynasylan Hydrosil 1151), aqueous amino/alkylfunctional siloxane (Dynasylan Hydrosil 2627 or 2909), aqueous diaminofunctional siloxane (Dynasylan Hydrosil 2776), aqueous, aqueous epoxyfunctional siloxane (Dynasylan Hydrosil 2926), amino/alkylfunctional oligosiloxane (Dynasylan 1146), vinyl/alkylfunctional oligosiloxane (Dynasylan 6598), oligomeric vinylsilane (Dynasylan 6490) or oligomeric short-chain alkylfunctional silane (Dynasylan 9896).

In one preferred embodiment, the organofunctional silane mixture contains, in addition to at least one silane without a functional binding group, at least one aminofunctional silane. The amino function is a functional group which can enter into one or more chemical interactions with most of the groups present in binders. This can involve a covalent bond, such as e.g. with isocyanate- or carboxylate-functions of the binder, or hydrogen bridge bonds such as with OH— or COOR-functions also ionic interactions. An amino function is therefore very well-suited to the purpose of chemically binding the pigment to various binders.

The following compounds are preferably used for this: 3-aminopropyltrimethoxysilane (Dynasylan AMMO; Silquest A-1110), 3-aminopropyltriethoxysilane (Dynasylan AMEO), [3-(2-aminoethyl)-aminopropyl]trimethoxysilane (Dynasylan DAMO, Silquest A-1120), [3-(2-aminoethyl)-aminopropyl]triethoxysilane, triaminofunctional trimethoxysilane (Silquest A-1130), bis-(gamma-trimethoxysilylpropyl)amine (Silquest A-1170), N-ethyl-gamma-aminoisobutytrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), N-cyclohexylaminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973) or mixtures thereof.

In a further preferred embodiment, the sane without a functional binding group is an alkyl silane. The alkyl silane preferably has the formula $R_{(4-z)}Si(X)_z$. In this formula, z is an integer from 1 to 3, R is a substituted or unsubstituted, unbranched or branched alkyl chain of 10 to 22 C atoms, and X is a halogen and/or alkoxy group. Preferred alkyl silanes are those with alkyl chains of at least 12 C atoms.

Aluminum effect pigments treated with such kind of after-coatings are described in EP 1084198 B2 and EP 3080209 B1.

Pearlescent Pigments of the Effect Pigment Mixture:

The pearlescent pigments used in the effect pigment mixture are silvery pearlescent pigments with optical properties reflecting a metallic look. The pearlescent pigments usually have optical properties such that the resulting color in reflection is essentially a neutral silver tone or a slightly colored tone and in absorption grey to anthrazite shades. With respect to pearlescent pigments the color tone "anthrazite" is also often referred to as "black". In this invention the term "silvery pearlescent pigments" is used for pearlescent pigments which have a combination of neutral silver or slightly colored reflection color and grey to anthrazite absorption color providing a metallic-like characteristic.

The optical properties of the silvery pearlescent pigments useable for the effect pigment mixture can be evaluated by making a drawdown of a colorless lacquer (preferably BASF farblos ZM 26-3025) with a pigmentation height of 10 wt.-% of the pearlescent pigment using a 100 μm doctor blade on a black/white cartoon paper. The total content of non-volatile components in the lacquer should be 30 wt.-%. The optical properties of the dried drawdowns are measured with a BYK-Mac instrument.

Preferably, the chroma $C^*_{15°}$ of such a drawdown of the silvery pearlescent pigments measured on black background is ≤15 more preferably ≤14 and most preferably ≤10.

The hiding power of the silvery pearlescent pigment in such drawdowns can be defined as the ratio of the $L^*_{75°,black}/L^*_{75°,white}$-values measured on the black to white background, respectively. This ratio is preferably higher than 70%.

This high hiding power is mainly achieved by the absorbing layer of the pearlescent pigments.

The lightness is represented by the $L^*_{15°}$ value which is close to the angle of reflection and preferably this value measured on the drawdowns on black background is above 90 and more preferably above 100 for the pearlescent pigments of the effect pigment mixture.

In a first preferred embodiment a) the silvery pearlescent pigments used in the effect pigment mixture are pearlescent pigments comprising a transparent substrate which is coated with a high-refractive index layer with n>1.8, which comprises or consists of an iron-oxide with Fe(II)-ions.

In a preferred embodiment the silvery pearlescent pigment a) has a coating comprising a meta oxide layer comprising Ti and Fe, wherein the iron is mainly Fe(II) ions, which is preferably an ilmenite ($FeTiO_3$) layer or a magnetite ($Fe_3O_4$) layer or mixtures thereof.

In a further preferred embodiment the pearlescent pigment has a coating comprising a first layer of $TiO_2$ followed by a metal oxide layer containing Fe(II)-ions, preferably consisting of ilmenite. Pearlescent pigments with a coating comprising a homogeneously distributed ilmenite ($FeTiO_3$) have been described in EP 1620511 A2. Pearlescent pigments with a coating comprising first a $TiO_2$ layer followed by an inhomogeneously distributed ilmenite layer have been described in WO 2012/130776 A1.

Further examples of such pearlescent pigments are disclosed in EP 246523 A2, EP 3119840 A1 (with an $Al_2O_3$ substrate) or EP 681009 A2 (with a further high-refractive index coating). Pearlescent pigments with a single layer of ilmenite on a $TiO_2$ platelet substrate have been described in WO 1997/043348 A1. The thicknesses of the layers disclosed in these documents need to be reduced in order to achieve the silvery to grey shaded pearlescent pigments in reflection as demanded in the effect pigment mixture.

In further preferred embodiments the silvery pearlescent pigment comprises the following structure:
(a) a transparent platelet-shaped synthetic substrate,
(b) a titanium oxide layer, followed by
(c) a metal oxide layer comprising Ti- and Fe-ions, wherein the Fe-ions are mainly Fe(II)-ions.

In a further preferred embodiment the silvery pearlescent pigment has a layer of ilmenite ($FeTiO_3$).

In further preferred embodiments the pearlescent pigment has an iron(III) oxide content of less than 0.5% by weight, based on the total weight of the pigment. All other amounts of Fe-ions in iron oxides are in the reduced Fe(II) oxidation state.

A higher amount of remaining Fe(III)-ions would lead to an undesired brownish absorption color. The amounts of Fe(II) or Fe(III) can be determined with Mößbauer spectroscopy or with XPS analysis, possibly combined with sputter profiles.

In further embodiments the total amount of iron compounds, calculated as elemental iron, in the silvery pearlescent pigment according to the invention is less than 5.0% by weight, preferably in a range from 1% by weight to 4.3% by weight, particularly preferably in a range from 1.4% by weight to 2.9% by weight and very particularly preferably in a range from 1.5% by weight to 2.3% by weight, based in each case on the total weight of the pearlescent pigment.

With such low amounts of Fe a silvery color can be well developed. Higher amounts than 5 wt.-% lead to pearlescent pigments with a too strong absorption color.

In further preferred embodiments the pearlescent pigment of type a) has an iron/titanium weight ratio as a function of the coating, in accordance with formula (III):

$$\frac{\text{Iron content (wt-\%)}}{\text{Titanium content (wt.-\%)}} \times \text{Fraction of the coating (wt.-\%)} \quad \text{(III)}$$

is in a range from 1 to 8. Herein "iron content" stands for the amount of iron compounds, calculated as elemental iron, and "titanium content" stands for the amount of titanium compounds, calculated as elemental titanium, in each case in the pearlescent pigment and based on the total weight of the pearlescent pigment, and where the "fraction of the coating (% by weight)" stands for the weight fraction, based on the total weight of the pearlescent pigment, of the overall coating applied to the substrate. Preferably this parameter is in a range from 2 to 7.5, particularly preferably in a range from 2.5 to 7, and very particularly preferably in a range from 3 to 6.

This parameter especially ensures that the pearlescent pigment has a silvery color as demanded in the effect pigment mixture.

In another embodiment b) the silvery pearlescent pigments comprise a transparent substrate which is coated with a high-refractive index layer with n>1.8 which comprises or consists of a titanium suboxide or a substrate with a high-refractive index n>1.8 layer comprising or consisting of a titanium suboxide that is optionally coated with a high-refractive index layer with n>1.8.

The high-refractive coating layer with n>1.8 of the second kind of pigment is made from a different material than the substrate's titanium suboxide and is preferably $TiO_2$.

The coated titanium suboxide layer or the titanium suboxide substrate denote to titanium oxides wherein the formal oxidation number of titanium is below 4. They can be represented by the formula:

$$Ti_nO_{2n-1} \quad \text{(IV)}$$

wherein n in an integer of 1 to 100, preferably n=1 to 10. Typical examples of such compounds are TiO, $Ti_2O_3$, $Ti_3O_5$, $Ti_4O_7$. Mixtures of any such species may be also included.

In further embodiments the titanium suboxide content can be less than 5% based on the total pigment and the main component of said titanium suboxide is $Ti_2O_3$.

An example of a commercially available pearlescent pigment with titanium suboxide is Iriodin® 9605 (Merck).

In another embodiment c) the silvery pearlescent pigments comprise a transparent substrate which is coated with a high-refractive index layer with n>1.8, which comprises or consists of titanium oxynitride.

The titanium oxynitrides can be expressed by the general formula:

$$Ti_xN_yO_z \quad \text{(V)}$$

wherein x is 0.2 to 0.6, y is 0.05 to 0.6 and z is 0.1 to 0.9, which comprises a solid solution of nitrogen in titanium monoxide.

Such pearlescent pigments have been described in U.S. Pat. No. 4,623,396 A. Pearlescent pigments with intense blue color or a bluish fade have been described in EP 332071 A1 or in EP 735115 A1.

Herein a first TiO₂ layer is reduced with ammonia at temperatures in the range of 750° C. to 850° C. If the optical thickness of the TiO₂ layer deposited in a first step is in the range of 50 to 100 nm silvery effect pigments are obtained.

In EP 842229 B1 pearlescent pigments are described were a platelet-like TiO₂ substrate is first formed by solidification of a hydrolysable aqueous solution of a titanium compound on an endless band. These substrates can be coated with further TiO₂ or other metal oxides and calcined under reducing conditions.

Examples of such pearlescent pigments are Paliocrom Blausilber L6000 and L6001, which have been earlier manufactured by BASF Colors and Effects GmbH.

In a further embodiment d) the pearlescent pigment of the effect pigment mixture comprises a transparent substrate which is coated with a layer comprising carbon, wherein the carbon is enclosed in a particulate form in another metal oxide layer or is formed as a separate, individual layer on at least one high-refractive index layer.

In DE 4227082 A1 pearlescent pigments were disclosed, wherein pearlescent substrates or TiO₂ coated pearlescent pigments were coated with organofunctional silanes and calcined or pyrolized under inert gas atmosphere yielding a pearlescent pigment containing carbon in silica matrix and having a darker color. Similar pearlescent pigments were disclosed in DE 4227082 A1.

In EP 3230384 A1 a pearlescent pigment with metallic silvery look was disclosed where on top of a high-refractive index coating like TiO₂ a very thin pure carbon layer is coated via a fluidized-bed apparatus.

In a further embodiment e) the pearlescent pigment of the effect pigment mixture comprises a transparent substrate platelet coated with a first layer comprising or consisting of a mixture of the oxides of titanium, iron and at least one of cobalt and chromium and a second layer on the first layer, wherein the second layer comprises an oxide of titanium.

Such pearlescent pigments have a black absorption color and are described in U.S. Pat. No. 6,361,593 B2 and U.S. Pat. No. 6,290,766 B1.

Commercially available Products are Vegetable Black Olive (BASF Colors and Effects).

In further embodiments mixtures or combinations of the pearlescent pigments a) to e) itself or pearlescent pigments with mixtures or combinations of the various coating layers mentioned in the pearlescent pigments a) to e) can be used.

For example, pearlescent pigments comprising a coating of mixtures or combinations of titanium suboxide and titanium oxynitride may be used.

In preferred embodiments the silvery pearlescent pigments are taken from the following group:

a) pearlescent pigments of type a), wherein the pearlescent pigment has a coating comprising a metal oxide layer comprising Ti- and Fe-ions, wherein the Fe-ions are mainly Fe(II) ions, which is preferably an ilmenite (FeTiO₃) layer, magnetite (Fe₃O₄) or mixtures thereof
or b) pearlescent pigments of type b), wherein the titanium suboxide can be represented by the formula

$$Ti_nO_{2n-1} \quad (IV)$$

wherein n in an integer of 1 to 10, or c) pearlescent pigments of type c), wherein the titanium oxynitride can be represented by the formula

$$Ti_xN_yO_z \quad (V)$$

wherein x is 0.2 to 0.6, y is 0.05 to 0.6 and z is 0.1 to 0.9, which comprises a solid solution of nitrogen in titanium monoxide, and mixtures or combinations of the pearlescent pigments a) to c) or pearlescent pigments with mixtures or combinations of the various coating layers mentioned in the pearlescent pigments a) to c).

The transparent substrates used for all kinds of the pearlescent pigments are typically natural or synthetic mica, glass flakes, SiO₂-flakes, Al₂O₃-flakes or mixtures thereof. Preferred substrates are glass flakes or synthetic mica as these substrates provide pearlescent pigments with pure silvery color tones and high gloss.

The high-refractive index layers of the silvery pearlescent pigments of type a), b) or c) preferably have an index of refraction n of >2.0 and more preferably n>2.3.

In preferred embodiments the silvery pearlescent pigments according to the invention may be provided with at least one external protective layer. This protective layer further enhances the light stability, weather stability and/or chemical stability of the pearlescent pigment. Especially the photoactivity of any TiO₂ layers and the concomitant destroying of organic resins in coatings may be effectively reduced by these protective layers.

The external protective layer of the silver-colored pigments according to the invention can comprise, or preferably consist of, one or two metal oxide layers and/or metal hydroxide layers and/or metal oxide hydrate layers of the elements Si, Al, Zr or Ce. In one variant, a silicon oxide layer, preferably SiO₂ layer, is applied as the outermost metal oxide layer. After these protective layer organofunctional coupling agents may be coated on the outermost protective layer as described above in the section dealing with aluminum effect pigments. In principle, the same kind of organofunctional coupling agents can be used as well for the silvery pearlescent pigments.

Such weatherstable external protective layer are described in EP 0 888 410 B1, EP 0 632 109 A1, EP 1727864 B1, EP 1 682 622 B1, EP 2691478 B1 or EP 2904052 B1, for example.

Effect Pigment Mixture:

The weight ratio of the silvery pearlescent pigment to the aluminum effect pigment is in a range of 0.4 to 5.0, preferably in a range of 0.5 to 4.2, more preferably in a range of 1.0 to 4.0 and most preferably in a range of 2.5 to 3.5.

Below of a ratio of 0.4 the attenuation of radar waves will be still too strong. Above of a ratio of 5.0 the effect pigment mixture will not have enough hiding power and the metallic character of coatings thereof diminishes.

The effect pigment mixture may comprise a mixture of the aluminum effect pigment and the silvery pearlescent pigment as such or may comprise any formulation in which the two effect pigments are contained with their respective wt.-ratios.

In preferred embodiments the effect pigment mixture comprises platelet-like aluminum effect pigments obtained by grinding of aluminum or aluminum based alloy shot and coated with SiO₂ and optionally with Mo-oxide and silvery pearlescent pigments, wherein the silvery pearlescent pigments are taken from the group consisting of:

a) pearlescent pigments comprising a transparent substrate which is coated with a high-refractive index layer with n>1.8, which comprises or consists of an iron-oxide with Fe(II)-ions, wherein the weight ratio of the pearlescent pigment to the aluminum effect pigment is in a range of 0.4 to 5.0, preferably in a range of 1.0 to 4.0. Both the SiO₂ and optionally with Mo-oxide coated aluminum effect pigment and the silvery pearlescent pigments are preferable further modified by organofunctional coupling agents, preferably organofunctional silanes. In case of using a Mo-oxide coating, it is preferred that a first coating of Mo-oxide followed by a $SiO_2$ coating on the aluminum substrate is carried out.

Coating Formulations:

Another embodiment of this invention is a coating formulation which comprises any of the above described effect pigment mixtures.

Such coating formulations further contain a binder, a solvent or solvent mixture, additives and as optional components fillers and/or conventional pigments.

Examples for the binder material are oil-based materials (based on linseed oil or polyurethane oils), cellulose-based materials (NC, CAB, CAP), materials based on chlorinated rubber, vinyl materials (based on PVC, PVDF, VC copolymer, polyvinyl acetate, polyvinyl ester dispersion, polyvinyl alcohol, polyvinyl acetal, polyvinyl ether, polystyrene, styrene copolymers), acrylic materials, alkyd materials, saturated polyester materials, unsaturated polyester materials, polyurethane materials (one pack, two pack), epoxy materials or silicone materials.

Preferred examples of binders usable in aqueous based systems are: polyurethane materials, epoxy materials, acrylic materials, polyvinyl alcohol, saturated polyester materials, unsaturated polyester materials. Preferably, these binders have an acid number in a range of 10 to 50 mg KOH/g.

It is preferred that the coating formulation is a water based formulation, as these formulations have more and more increasing portions of all coating formulations worldwide due to ecological reasons. Here most of the solvent is water, but small additional amounts of organic solvents are still desirable.

As additives typically wetting and dispersing additives, deformer or air release additives or rheology additives are used. The total amount of all additives is usually below 3 wt.-%, preferably below 2 wt.-%, based on the total coating formulation.

Examples of commercially available additives are Disperbyk 190, Disperbyk 190 N, Disperbyk 184, Disperbyk 198, Disperbyk 2010, Disperbyk 2012, Disperbyk 2015, Byk 015, Byk 024, Byk 011, Byk 028, Byk 310, Byk 346, Byk 347, Byk 378 or Byk 1770 (all from Byk Additives & Instruments).

As fillers typically silica or alumina particles are used. Examples are Laponite-RD (Byk Additives & Instruments)

As conventional pigments inorganic or organic pigments can be used. With conventional pigments it is meant that these pigments do not have an angle dependency (either the angle of incidence or of observation) in their optical properties which is just contrary to effect pigments. These conventional pigments are used to impart to the coating film color, if demanded.

The conventional pigment may be an organic: pigment, an inorganic: pigment or a mixture thereof. Accordingly, in a preferred aspect, the conventional pigment is a transparent pigment, especially selected from the group consisting of an organic pigment, an inorganic pigment and a mixture thereof.

Organic colored absorption pigments suitable for the present coating formulation include, for example, a pigment selected from the group consisting of a monoazo, disazo, disazo condensation, anthanthrone, anthraquinone, anthrapyrimidine, benzimidazolone, quinacridone, quinophthalone, diketopyrrolopyrrole, dithioketopyrrolopyrrole, dioxazine, flavanthrone, isoindoline, isoindolinone, isoviolanthrone, metal complex, perinone, perylene, pyranthrone, pyrazoloquinazolone, indigo, thioindigo, triarylcarbonium pigment and a mixture thereof, including a solid solution or a mixed crystal thereof.

Suitable commercially available examples include the following:

Monoazo pigments: C.I. Pigment Yellow 1, 3, 62, 65, 73, 74, 97, 183 and 191; C.I. Pigment Orange 5, 38 and 64; C.I. Pigment Red 1, 2, 3, 4, 5, 23, 48:1, 48:2, 46:3, 48:4, 49, 49:1, 51, 51:1, 52:1, 52:2, 53, 53:1, 53:3, 57:1, 56:2, 53:4, 63, 112, 146, 148, 170, 184, 187, 191:1, 210, 245, 247 and 251;

Disazo pigments: C.I. Pigment Yellow 12, 13, 14, 16, 17, 81, 83, 106, 113, 126, 127, 155, 170, 174, 176 and 188; C.I. Pigment Orange 16, 34 and 44;

Disazocondensation pigments; C.I. Pigment Yellow 93, 95 and 128; C.I. Pigment Red 144, 166, 214, 220, 221, 242 and 262;

Anthanthrone pigments: C.I. Pigment Red 168;

Anthraquinone pigments: C.I. Pigment Yellow 147 and 199; C.I. Pigment Red 177;

Anthrapyrimidine pigments: C.I. Pigment Yellow 108;

Benzimidazolone pigments: C.I. Pigment Yellow 120, 151, 154, 180, 181; C.I. Pigment Orange 36 and 72, C.I. Pigment Red 175, 185, 208; C.I. Pigment Violet 32; C.I. Pigment Brown 25;

Quinacridone pigments: C.I. Pigment Orange 48 and 49; C.I. Pigment Red 122, 202, 206 and 209; C.I. Pigment Violet 19;

Quinophthalone pigments: C.I. Pigment Yellow 138;

Diketopyrrolopyrrole pigments: C.I. Pigment Orange 71, 73 and 81; C.I. Pigment Red 254, 255, 264, 270 and 272;

Dioxazine pigments: C.I. Pigment Violet 23 and 37;

Flavanthrone pigments: C.I. Pigment Yellow 24;

isoindoline pigments: C.I. Pigment Yellow 139 and 185; C.I. Pigment Orange 61 and 69. C.I. Pigment Red 260;

Isoindolinone pigments: C.I. Pigment Yellow 109, 110 and 173;

Isoviolanthrone pigments: C.I. Pigment Violet 31;

Metal complex pigments: C.I. Pigment Red 257; C.I. Pigment Yellow 117, 129, 150, 153 and 177;

Perinone pigments: C.I. Pigment Orange 43; C.I. Pigment Red 194;

Perylene pigments: C.I. Pigment Red 123, 149, 178, 179 and 224; C.I. Pigment Violet 29;

Pyranthrone pigments: C.I. Pigment Orange 51; C.I. Pigment Red 216;

Pyrazoloquinazolone pigments: C.I. Pigment Orange 67 and C.I. Pigment Red 216;

Indigo pigments: C.I. Pigment Red 282;

Thigindigo pigments: C.I. Pigment Red 88 and 181; C.I. Pigment Violet 38;

Triarylcarbonium pigments: C.I. Pigment Red 81, 81:1 and 169; C.I. Pigment Violet 1, 2, 3 and 27;

C.I. Pigment Yellow 101 (Aldazin yellow).

In further embodiments the coating formulation contains additional pearlescent pigments. The additional pearlescent pigments are none of the ones used in the effect pigment mixture described above. The additional pearlescent pigments are characterized therein, that they are based on a transparent substrate and the layers contributing to the color consist of one or two high-refractive index layers consisting of $TiO_2$, $Fe_2O_3$ or mixtures thereof, and optionally one or more low refractive layers with n<1.8.

Preferably, these additional pearlescent pigments have one layer consisting of $TiO_2$ or $Fe_2O_3$, most preferably one layer consisting of TiO$_2$. "Consisting of TiO$_2$" means in this case, that small amount of SnO$_2$ may be present which may have been used to rutilize the TiO$_2$ in well known manner.

These additional pearlescent pigments do have mainly coloristic properties. They may be used to adjust color tones or to improve the flop. Usually they do not have the opacity and the metallic appearance of the pearlescent pigments used for the effect pigment mixture.

In preferred embodiments the total amount of the effect pigments of the effect pigment mixture and optionally the additional pearlescent pigments is in a range of 2 to 5.5 wt.-%, based on the total amount of the coating formulation. More preferably, the total amount of the effect pigments of the effect pigment mixture and optionally the additional pearlescent pigments is in a range of 3 to 5.2 wt.-%; most preferably in a range of 3.5 to 5.0 wt.-%, each based on the total amount of the coating formulation.

Above an amount of 5.5 wt.-% the flop properties decrease due to misalignment of the effect pigments and also the mechanical properties of the coating film like intercoat adhesion can be insufficient. Below of an amount of 2 wt.-% the hiding power will be too low.

In further embodiments of the coating formulation, the total amount of all the pearlescent pigments, i.e. the amount of the pearlescent pigment of the effect pigment mixture and the additional pearlescent pigments, is in a range of 2 to 4 wt.-%, based on the total amount of the coating formulation. More preferably, the total amount of all the pearlescent pigments is in a range of 2.5 to 3.8 wt.-% and most preferably the total amount of all the pearlescent pigments is in a range of 2.75 to 3.5 wt.-%, each based on the total amount of the coating formulation.

In further embodiments of the coating formulation the amount of the platelet-like aluminum effect pigment of the effect pigment mixture is in a range of 1.0 to 2.3 wt.-%, based on the total amount of the coating formulation. More preferably, the amount of the platelet-like metallic effect pigment of the effect pigment mixture is in a range of 1.3 to 2.0 wt.-% and most preferably in an range of 1.5 to 1.9 wt.-%, each based on the total amount of the coating formulation. Such low amounts can be surprisingly used and still coatings with a very good metallic appearance are obtained.

If the concentration of the aluminum effect pigments exceeds 2.3 wt.-% the radar wave transparency may be become too low and furthermore a disorientation and therefore a loss in flop and gloss may occur. Below of a concentration of 1.0 wt.-% the metallic effect (especially flop) diminishes and the hiding power of the coated film gets too low.

In further embodiments of the coating formulation the weight-% ratio of the effect pigments of the effect pigment mixture and of the optionally additional pearlescent pigments to the binder is in a range of 0.1 to 0.8. Preferably the weight-% ratio of the effect pigments of the effect pigment mixture and of the optionally additional pearlescent pigments to the binder is in a range of 0.1 to 0.7, more preferably in a range of 0.2 to 0.6 and most preferably in a range of 0.18 to 0.4.

Below 0.1 the amount of effect pigments is too low to achieve the desired optical properties. Above 0.8 the technical properties of the resulting coating film like a reduced intercoat adhesion or chalking of the effect pigments may occur.

In a very preferred embodiment the coating formulation comprises an effect pigment mixture comprising platelet-like aluminum effect pigments obtained by grinding of aluminum or aluminum based alloy shot and coated with SiO$_2$ and optionally with Mo-oxide and silvery pearlescent pigments, wherein the silvery pearlescent pigments are taken from the group consisting of:

a) pearlescent pigments comprising a transparent substrate which is coated with a high-refractive index layer with n>1.8, which comprises or consists of an iron-oxide with Fe(II)-ions, wherein the weight ratio of the pearlescent pigment to the aluminum effect pigment is in a range of 0.4 to 5.0, preferably in a range of 1.0 to 4.0. Both the SiO$_2$ and optionally with Mo-oxide coated aluminum effect pigment and the silvery pearlescent pigments are preferable further modified by organofunctional coupling agents, preferably organofunctional silanes. In case of using a Mo-oxide coating, it is preferred that a first coating of Mo-oxide followed by a SiO$_2$ coating on the aluminum substrate is carried out. The concentration of SiO$_2$ coated aluminum pigments is in a range of 1.3 to 2.0 wt.-%, based on the total amount of the coating formulation. Preferably, the total amount of all the pearlescent pigments, i.e. the amount of the pearlescent pigment of the effect pigment mixture and the additional pearlescent pigments, is in a range of 2 to 4 wt.-%, based on the total amount of the coating formulation.

A further embodiment of this invention is the use of the effect pigment mixture in a coating or a printing ink. In preferred embodiments the coatings are water-based OEM or refinish automotive coatings.

A further embodiment of this invention is the use of the effect pigment mixture or of the coating formulation containing the effect pigment mixture to form a radio wave transparent coating film on plastic substrates. The plastic substrates are preferably used to hide sensors working with radio frequency waves. In preferred embodiments the plastic substrates are automotive bumpers, radiator grills, automotive back panels, door trim strips, back mirror casings or handy casings.

The plastic substrates may be for example thermoplastic resins such as polycarbonate (PC), acrylonitrile-butadiene-styrene (ABS) copolymer, acrylonitrile-ethylene-styrene (ABS) copolymer, and polypropylene (PP).

A further embodiment of this invention are radio wave transparent coated film on a plastic substrate, preferably on an automotive bumper, made from the coating formulation containing the effect pigment mixture and described above.

It is preferred that this coated film on the plastic substrate has a thickness of the dried film is in a range of 8 to 17 µm and more preferably in the range of 10 to 16 µm and further more preferred in a range of 12 to 15 µm.

Thicknesses above 17 µm are hardly acceptable for the paint industry for cost reasons. Nowadays automotive coatings or coatings on plastic parts like car bumpers typically have a thickness of 15 µm or below. Coatings with thicknesses exceeding 17 µm will hardly be acceptable.

EXAMPLES

Example 1

A commercially available silica coated aluminum effect pigment (Stapa IL Hydrolan 2156, Eckart GmbH), wherein the aluminium substrate has a d$_{50}$=about 18 µm and a h$_m$ of about 285 nm, was mixed with a commercially available silvery pearlescent pigment (Symic OEM medium opaque silver; Eckart GmbH), which is based on synthetic mica and contains a TiO$_2$ layer followed by a Ti—Fe mixed metal oxide with essentially only Fe(II)-ions. The amounts are disclosed in table 1. These effect pigments were incorporated into an aqueous base coat finish of Wörwag based on polyacrylate.

The coatings were applied on a black acrylonitrile butadiene styrene copolymer (ABS) panel substrates using an automatic spraying machinery of Örter & Köhne GmbH at a thickness of the dried film of 15 µm. The ratio of the weight of the effect pigments to the binder were varied in such manner that the coatings were totally hiding.

These two effect pigments were mixed in various proportions as depicted in table 1.

The flop was determined by the well-known formula (VI):

$$\text{flop} = 2.69 \frac{(L^*_{15°} - L^*_{110°})^{1.11}}{L^*_{45°}} \quad \text{(VI)}$$

Measurement of Radiofrequency Attenuation:

The transmission of radar signals was measured with a vector network analyzer and two horn antennas in a frequency range of 75 GHz to 80 GHz. The sample is placed in between the sender antenna and the receptor antenna with perpendicular incidence of the electromagnetic waves. The half width of the antennas was 9° in the plane of the electrical wave vector and 12° in the plane of the magnetic wave vector. By adjusting the distance of sample and antenna it was ensured that the plane illuminated by the antenna was clearly smaller than the sample to reduce the influence of edges.

First a measurement without any sample was made to calibrate the system. Then a measurement with the plastic panel without any coated lacquer was done. All further measurements were referred to this measurement eliminating the influence of cables, antennas and so on. The accuracy of the measurements was 0.5 dB. The measured attenuations were very constant in the frequency region measured.

TABLE 1

Data of Examples 1

| Sample | Amount of metallic effect pigment [wt.-%] | Amount of ilmenite containing pearlescent pigment [wt.-%] | Ratio wt. metallic effect pigment to pearlescent pigment | Wt.-ratio of effect pigments to binder | Attenuation amount of millimetre wave transmission [dB] | L 15° | Flop |
|---|---|---|---|---|---|---|---|
| Comparative Example 1a | 2.9 | 0 | — | 0.22 | −3.5 | 154.1 | 16.7 |
| Example 1.1a | 1.9 | 1.9 | 1.0 | 0.29 | −2.0 | 150.3 | 16.9 |
| Example 1.2a | 1.0 | 4.0 | 4.0 | 0.71 | −1.5 | 139.1 | 14.8 |

It can be well seen that the addition of the pearlescent pigments diminishes the radio wave attenuation in an acceptable manner. The changes in the flop are below 2.0 and thus acceptable.

Examples Series 2

A series with a silica coated metallic effect pigment with cornflake morphology (IL Hydrolan 8154, Eckart GmbH), wherein the aluminum substrate had a $d_{50}$ of 20 µm and a $h_m$ of the aluminum substrate of about 280 nm was mixed with with a commercially available ilmenite-containing pearlescent pigment (Symic OEM medium opaque silver; Eckart GmbH) at various ratios as depicted in table 3. As a comparative Example the pure metallic effect pigment was applied.

The mixtures were applied to 15 µm thickness of the dried film with a constant ratio of the effect pigments to binder of 0.25 using an aqueous base coat finish of Wörwag based on polyacrylate and an automatic spraying machinery of Örter & Köhne GmbH. In all probes including the comparative Example the black pigment Hostafine Black TS 30 was added as tinting agent at a total concentration of 0.07 wt.-%, based on the total weight of the lacquer.

Examples Series 3

A series similar the series of Example 2 was made using as a silica coated metallic effect pigment of silver dollar morphology (IL Hydrolan 412, Eckart GmbH), wherein the aluminum substrate had a $d_{50}$ of 13 µm and a $h_m$ of about 95 nm, was mixed with with a commercially available ilmenite-containing pearlescent pigment (Symic OEM medium opaque silver; Eckart GmbH) at various ratios as depicted in table 3. As a comparative Example the pure metallic effect pigment was applied.

The samples were applied in the same manner as in the Example series 2.

Examples Series 4

A series similar the series of Example 2 was made using as a silica coated metallic effect pigment of silver dollar morphology (IL Hydrolan 418, Eckart GmbH)), wherein the aluminum substrate had a $d_{50}$ of 21 µm and a $h_m$ of about 310 nm, was mixed with with a commercially available ilmenite-containing pearlescent pigment (Symic OEM medium opaque silver, Eckart GmbH) at various ratios as depicted in table 3. As a comparative Example the pure metallic effect pigment was applied.

As further Comp. Examples mixtures of IL Hydrolan 418 with pearlescent pigments composed of $TiO_2$ coated synthetic Mica (Symic OEM medium silver, Eckart GmbH) in analogy to US 2010/0022696 A1: at two different ratios of the two effect pigments were applied.

The samples were applied in the same manner as in the Example series 2.

Examples Series 5

A series similar the series of Example 2 was made using as a silica coated metallic effect pigment of silver dollar morphology (IL Hydrolan 422, Eckart GmbH)), wherein the aluminum substrate had a $d_{50}$ of 24 µm and a $h_m$ of about 390 nm was mixed with with a commercially available ilmenite-containing pearlescent pigment (Symic OEM medium opaque silver, Eckart GmbH) at various ratios as depicted in table 3. As a comparative Example the pure metallic effect pigment was applied.

Comparative Examples 6

In order to exploit the influence of the silica coating on the radio wave transparency two Comparative Examples having no silica coating (Comp. Example 6.1; MEX 2156, Eckert) and a silica coating (Comp. Example 6.2; Hydrolan 2165) were applied in the same manner as described in Example 1.

TABLE 2

Influence of a silica coating on the attenuation (Comparative Examples 6)

| Sample | Amount of metallic effect pigment [wt.-%] | Amount of SiO₂ coating [wt.-%] | Wt.-ratio of effect pigments to binder | Attenuation amount of radio frequency wave transmission [dB] | L 15° | Flop |
|---|---|---|---|---|---|---|
| Comparative Example 6.1 | 4.5 | — | 0.75 | −6 | 170.9 | 25.9 |
| Example 6.2 | 4.5 | 0.3 | 0.75 | −5 | 167.6 | 21 |

Although both comparative Examples fail the attenuation test it can be well seen, that a silica coating already decreases the attenuation by about one dB. Thus a silica coating of a metallic effect pigment not only ensures gassing stability of the effect pigment in aqueous-based base coatings but also improves the attenuation of the radar electromagnetic radiation. There is thus a synergetic effect in the attenuation of the radar electromagnetic radiation when using metal oxide coated metal effect pigments such as silica coated metal effect pigments.

Example 7

Mixture of a $SiO_2$ coated metal pigment (IL Hydrolan 418, Eckart GmbH) with an Ilmenite containing pearlescent pigment (Iriodin 9602 SW from Merck) which is disclosed according to EP 246523 B1.

TABLE 3

Mixture ratios, optical Properties and radio wave attenuation for Example series 2, 3, 4, and 5 with Comp. Examples

| Sample | Kind of Pearlescent Pigment | Kind of Aluminum Pigment | Wt.-% ratio of Pearlescent pigment to Aluminum pigment | $L^*_{15°}$ | $L^*_{45°}$ | $L^*_{110°}$ | Flop | ΔFlop | ΔFlop/Flop in % | Radio frequency attenuation test |
|---|---|---|---|---|---|---|---|---|---|---|
| Comp. Example 1.0 | — | Hydrolan 2156 | 0:100 = 0 | 138.8 | 49.12 | 19.52 | 19.8 | 0 | 0 | −3.5 not pass |
| Example 1b | Symic OEM medium opaque silver | Hydrolan 2156 | 50:50 = 1.0 | 127.99 | 47.45 | 17.83 | 17.98 | −1.82 | −10.1 | −2.3 pass |
| Example 1c | Symic OEM medium opaque silver | Hydrolan 2156 | 60:40 = 1.5 | 125.18 | 46.18 | 16.68 | 18.10 | −1.7 | −9.4 | −1.8 pass |
| Example 1d | Symic OEM medium opaque silver | Hydrolan 2156 | 70:30 = 2.3 | 122.28 | 40.79 | 14.13 | 20.07 | 0.27 | 1.3 | −1.6 pass |
| Example 1e | Symic OEM medium opaque silver | Hydrolan 2156 | 80:20 = 4.0 | 118.79 | 39.05 | 13.28 | 20.27 | 0.47 | 2.3 | −1.5 pass |
| Comp. Example 2.0 | | Hydrolan 8154 | 0:100 = 0 | 134.42 | 50.06 | 20.52 | 17.8 | 0.0 | 0 | −3.7 not pass |
| Example 2.1 | Symic OEM medium opaque silver | IL Hydrolan 8154 | 50:50 = 1.0 | 128.07 | 47.90 | 18.05 | 17.81 | 0.01 | 0.1 | −2.6 pass |
| Example 2.2 | Symic OEM medium opaque silver | IL Hydrolan 8154 | 60:40 = 1.5 | 125.96 | 45.93 | 17.05 | 18.26 | 0.46 | 2.5 | −1.9 pass |
| Example 2.3 | Symic OEM medium opaque silver | IL Hydrolan 8154 | 70:30 = 2.3 | 117.01 | 40.85 | 14.03 | 18.98 | 1.18 | 6.2 | −1.7 pass |
| Example 2.4 | Symic OEM medium opaque silver | IL Hydrolan 8154 | 80:20 = 4.0 | 118.67 | 40.93 | 14.44 | 19.20 | 1.4 | 7.3 | −1.5 pass |
| Comp. Example 3.0 | — | Hydrolan 412 | 0:100 = 0 | 139.79 | 55.75 | 22.92 | 16.7 | 0.00 | 0 | −3.5 not pass |
| Example 3.1 | Symic OEM medium opaque silver | IL Hydrolan S 412 | 50:50 = 1.0 | 133.88 | 52.72 | 20.15 | 17.02 | 0.32 | 1.9 | −2.8 pass |
| Example 3.2 | Symic OEM medium opaque silver | IL Hydrolan S 412 | 60:40 = 1.5 | 131.95 | 51.65 | 19.77 | 17.06 | 0.36 | 2.1 | −2.3 pass |
| Example 3.3 | Symic OEM medium opaque silver | IL Hydrolan S 412 | 70:30 = 2.3 | 127.63 | 48.20 | 17.81 | 17.68 | 0.98 | 5.5 | −1.9 pass |

TABLE 3-continued

Mixture ratios, optical Properties and radio wave attenuation for Example series 2, 3, 4, and 5 with Comp. Examples

| Sample | Kind of Pearlescent Pigment | Kind of Aluminum Pigment | Wt.-% ratio of Pearlescent pigment to Aluminum pigment | $L^*_{15°}$ | $L^*_{45°}$ | $L^*_{110°}$ | Flop | ΔFlop | ΔFlop/Flop in % | Radio frequency attenuation test |
|---|---|---|---|---|---|---|---|---|---|---|
| Example 3.4 | Symic OEM medium opaque silver | IL Hydrolan S 412 | 80:20 = 4.0 | 123.96 | 44.92 | 15.92 | 18.45 | 1.75 | 9.5 | −1.6 pass |
| Comp. Example 4.0 | — | IL Hydrolan S 418 | 0:100 = 0 | 144.59 | 41.51 | 14.97 | 24.2 | 0.00 | 0 | −4.0 not pas |
| Example 4.1 | Symic OEM medium opaque silver | IL Hydrolan S 418 | 50:50 = 1.0 | 138.81 | 42.34 | 14.38 | 22.70 | −1.50 | −6.6 | −2.9 pass |
| Example 4.2 | Symic OEM medium opaque silver | IL Hydrolan S 418 | 60:40 = 1.5 | 135.17 | 41.32 | 13.99 | 22.51 | −1.69 | −7.5 | −2.4 pass |
| Example 4.3 | Symic OEM medium opaque silver | IL Hydrolan S 418 | 70:30 = 2.3 | 132.09 | 40.46 | 13.60 | 22.36 | −1.84 | −8.2 | −1.8 pass |
| Example 4.4 | Symic OEM medium opaque silver | IL Hydrolan S 418 | 80:20 = 4.0 | 127.11 | 38.45 | 12.62 | 22.49 | −1.71 | −7.6 | −1.6 pass |
| Comp. Example 4.5 | Symic OEM medium silver | IL Hydrolan S 418 | 50:50 = 1.0 | 136.80 | 43.49 | 15.40 | 21.59 | −2.61 | −12.1 | −2.9 pass |
| Comp. Example 4.6 | Symic OEM medium silver | IL Hydrolan S 418 | 60:40 = 1.5 | 134.29 | 42.17 | 14.69 | 21.80 | −2.4 | −11.0 | −2.6 pass |
| Example 7 | Iriodin 9602 SW | IL Hydrolan S 418 | 50:50 = 1.0 | 138.54 | 43.23 | 14.91 | 22.14 | −2.06 | −9.4 | −2.9 pass |
| Comp. Example 5.0 | — | IL Hydrolan S 422 | 0:100 = 0 | 141.56 | 36.82 | 14.31 | 26.3 | 0.00 | 0 | −3.0 not pass |
| Example 5.1 | Symic OEM medium opaque silver | IL Hydrolan S 422 | 50:50 = 1.0 | 131.65 | 36.79 | 12.64 | 24.39 | −1.91 | −7.8 | −1.6 pass |
| Example 5.2 | Symic OEM medium opaque silver | IL Hydrolan S 422 | 60:40 = 1.5 | 134.18 | 38.13 | 13.24 | 24.07 | −2.23 | −9.3 | −1.7 pass |
| Example 5.3 | Symic OEM medium opaque silver | IL Hydrolan S 422 | 70:30 = 2.3 | 131.09 | 37.25 | 12.83 | 23.96 | −2.34 | −9.8 | −1.6 pass |
| Example 5.4 | Symic OEM medium opaque silver | IL Hydrolan S 422 | 80:20 = 4.0 | 125.27 | 35.31 | 11.50 | 24.03 | −2.27 | −9.4 | −1.4 pass |

From Table 3 it can be seen that the $L^*_{15°}$-value, which is a measure of the brilliance, or all the inventive Examples denoted to mixtures of Symic OEM medium opaque silver and silica coated aluminum pigments decreases compared to the coating with the pure aluminum pigments (Comparative Examples). The typical metallic effect is best described by the flop-value defined according to formula (VI) (DuPont). The Δflop was calculated from the flop value for the effect pigment mixture minus the flop value for the respective pure metallic coating (Comparative Example). As for a coating series with a generally high flop value the difference Δflop may be relatively low the parameter Δflop/flop in % was additionally calculated. For all the Examples of series 2, 3 and 4 the absolute value of the Δflop is ≤2.0. Such small difference is tolerable. Some Examples even had an increase in the flop (positive Δflop). The Comparative Examples 4.5 and 4.6 which are mixtures of Hydrolan 418 with pearlescent pigments having a simple $TiO_2$ coating have a higher Δflop-value of −2.61 and −2.4, respectively.

Only for the series of Examples 5 the Δflop is slightly larger than 2.0. In this case the $d_{50}$-value for the aluminum pigment is 24 μm and the absolute flop values are rather high. For such relatively large effect pigments higher Δflop-values are acceptable as these larger aluminum pigments have a relative Δflop of above −10%. A Δflop/flop of larger than −10.5% was generally acceptable. The Comparative Examples 4.5 and 4.6 had the largest values of −12.1% and −11.0% and were not acceptable.

Examples 8, 9 and 10 and Comparative Examples 7, 8, 9 and 11 Regarding Matching of Existing Metallic Waterborne Formulations Three existing aluminum waterborne formulations of commercially used metallic color tones based on pure silica coated metallic pigments have been attempted to be matched by refinish formulations containing the effect pigment mixture of silica coated metallic pigments, ilmenite-containing pearlescent pigments and further pearlescent pigments. The three existing aluminum waterborne formulations were:
Comp. Example 7: "Reflex Silver" (Volkswagen)
Comp. Example 8: "Iridium Silver" (Daimler) and
Comp. Example 9: "Glacier Silver" (BMW)
As a waterborne automotive system a system from SPIES HECKER, Germany was used (Permahyd® HI-TEC). All components are commercially available. Table 4 lists all components in their respective amounts in wt.-%.

The coatings were applied on a black acrylonitrile butadiene styrene copolymer (ABS) panel substrates using an automatic spraying machinery of Örter & Köhne GmbH at a thickness of the dried film of 15 μm.

The pearlescent pigment Luxan CFX C001 (Eckert GmbH) is a silvery pearlescent pigment based on a glass flake substrate and coated with $TiO_2$. Luxan CFX C261 is a bluish pearlescent based on a glass flake substrate and coated with $TiO_2$. These pearlescent pigments do not have a high hiding power, but add sparkle to the formulation. Symic OEM Superfine Silver and Symic OEM Fine Blue are pearlescent pigments based on synthetic mica with a $TiO_2$ coating. They were added to reduce the flop which had been too strongly increased by the symic opaque pigment and additionally to adjust the color tones.

Two slurries of silica coated aluminum flakes (Stapa IL Hydrolan S408 and Stapa IL Hydrolan S418) were first mixed with appropriate amounts of butyl glycol forming a slurry of aluminum pigments. The aluminum substrates of Stapa IL Hydrolan S408 had a $d_{50}$ of about 11 μm and a $h_m$ of about 82 nm. All pearlescent pigments were mixed and dispersed in a butylglycol/demineralised water 1:4-mixture. Dimethanol methyl amine (DMEA) was added and the slurry was finished by adding water. Both slurries were added under stirring to the binder dispersion. All other components were added subsequently. All amounts of all the components are given in Table 4 as wt.-%. Before the application 20 wt.-% of an additive mixture was added.

Comp. Example 11: For the color tone "Glacier Silver" (BMW) an additional matching formulation was made. Here no Symic OEM Medium Opaque Silver was used. Instead the amount of Symic OEM Superfine Silver was adjusted. The amount of Luxan was kept constant as an increase of this amount would have surely increased the sparkle too much.

Optical and Effect Measurements

Effect measurements for determining the glitter effect of the pigments were carded out on the basis of the spray applications described above and in Table 4, using a BYK-mac (Byk-Gardner).

To simulate effect changes upon direct illumination, the glitter effect is investigated with the BYK-mac, using a high-resolution COD camera. The glitter effect, caused by the reflecting ability of the individual effect pigments, is perceived only upon direct solar irradiation, and changes depending on the angle of illumination. For this reason, the sample in the Byk-mac illuminated with very bright LEDs at three different angles (15°/45°/75°). Using the CCD camera, an image is recorded in each case perpendicularly to the surface. The images are analyzed using image processing algorithms, with the histogram of the lightness stages being used as a basis for calculating the glitter parameters. In order to ensure improved differentiation, the glitter effect was described using a two-dimensional system, the glitter area S_a and the glitter intensity S_i. Alternatively, the named data were summarized in a one-dimensional value, the glitter degree S_G.

Critical to the visual impression is the one-dimensional glitter degree S_G. The higher the numerical value of S_G, the higher the glitter effect perceptible to the eye. In a two-dimensional representation, the glitter degree S_G can be broken down into the components of glitter intensity S_i and glitter area S_a. Since both components have a critical influence on the clutter degree S_G, it may happen that an effect pigment has virtually the same Otter degree S_G in the 15°, 45° and 75° measurement geometries, despite the fact that the numerical values of S_a and S_G in the measurement geometries under consideration are significantly increased or lowered.

The optical measurements were made with a Byk-MAC (D65, 10°).

In Table 5 the results of all measurements are displayed. Here the first number in a cell denotes to the absolute values measured on the original color tones (Comp. Examples 7, 8 and 9). The second number denotes to the difference measured with the match formulation to this first value.

Regarding the radio frequency attenuation test Comparable Example 7 ("Reflex Silver") exhibited a value of −3.5 whilst Example 8 had only a value of −1.4.

TABLE 4

Formulations of matches of existing automotive metallic silver color tones:

| | Example 8: match of "Reflex Silver" (Volkswagen) | | Example 9: match of "Iridium Silver" (Daimler) | | Example 10: match of "Glacier Silver" (BMW) | | Comp. Example 11: match of "Glacier Silver" (BMW) Opaque Silver | |
|---|---|---|---|---|---|---|---|---|
| Components: | Wt.-% | $Al_{solid}$ [wt.-%] | Wt.-% | $Al_{solid}$ [wt.-%] | Wt.-% | $Al_{solid}$ [wt.-%] | Wt.-% | $Al_{solid}$ [wt.-%] |
| Slurry Stapa IL Hydrolan S408 | 6.00 | 0.97 | 6.50 | 1.05 | | | | |
| Slurry Stapa IL Hydrolan S418 | 4.50 | 0.87 | 4.00 | 0.78 | | | | |
| Slurry Stapa IL Hydrolan 9160 | | | | | 9.25 | 1.94 | 9.25 | 1.94 |
| Symic OEM Medium Opaque Silver | 1.00 | | 1.50 | | 2.7 | | 0.0 | |
| Symic OEM Superfine Silver | 0.50 | | | | 1.00 | | 3.70 | |
| Symic OEM Fine Blue | | | 1.00 | | | | | |
| Luxan CFX C001 | 2.50 | | | | | | | |
| Luxan CFX C261 | | | | | 0.30 | | 0.30 | |
| Butylglycol/dem. Water 1:4-mix | 5.00 | | 5.00 | | 5.00 | | 5.00 | |
| DMEA (10%) | 1.00 | | 1.00 | | 1.00 | | 1.00 | |
| Dem. Water | 7.50 | | 7.50 | | 7.50 | | 7.50 | |
| Binder-Components | 67.55 | | 66.0 | | 65.55 | | 65.55 | |
| WT 386-Flop Control (Additive) | 2.25 | | 3.00 | | 6.25 | | 6.25 | |
| WT 353-Magenta Red | 1.00 | | 2.75 | | 0.20 | | 0.20 | |
| WT 351-Azur Blue | 1.20 | | 0.75 | | 1.25 | | 1.25 | |
| Sum | 100.0 | | 100.0 | | 100.0 | | 100.0 | |
| +Additive mixture | +20.00 | | +20.00 | | +20.00 | | +20.00 | |
| Total content of metallic pigments (wt.-%)*: | | 1.53 | | 1.53 | | 1.62 | | 1.62 |

TABLE 4-continued

Formulations of matches of existing automotive metallic silver color tones:

| | Example 8: match of "Reflex Silver" (Volkswagen) | | Example 9: match of "Iridium Silver" (Daimler) | | Example 10: match of "Glacier Silver" (BMW) | | Comp. Example 11: match of "Glacier Silver" (BMW) Opaque Silver | |
|---|---|---|---|---|---|---|---|---|
| Components: | Wt.-% | $Al_{solid}$ [wt.-%] | Wt.-% | $Al_{solid}$ [wt.-%] | Wt.-% | $Al_{solid}$ [wt.-%] | Wt.-% | $Al_{solid}$ [wt.-%] |
| Wt.-ratio Symic OEM medium opaque silver to metallic pigments: | 0.54 | | 0.82 | | 1.39 | | 0.0 | |
| Sum of all pearlescent pigments (wt.-%)*: | 3.33 | | 2.92 | | 3.33 | | 3.33 | |
| Sum of all effect pigments (wt.-%)*: | 4.86 | | 4.45 | | 4.95 | | 4.95 | |

*The factor of 1.2 due to the addition of the additive mixture at the end has been considered here

TABLE 5

Results of Color and Effect Measurements:

| | Color measurements with BYK-Mac | | | | | | | Effect measurements with BYK-Mac | | |
|---|---|---|---|---|---|---|---|---|---|---|
| | Angle of | | | | | | | | | |
| Sample: | Obser- vation [°] | L* ΔL* | a* Δa* | b* Δb* | ΔE* | ΔE*$_{mean}$ | Flop ΔFlop | Angle: | $S_a$ Δ $S_a$ | $S_i$ Δ$S_i$ | G ΔG |
| Comparative Example 7 (absolute) and Example 8: match "Reflex Silver" (Volks- wagen) (difference) | -15 | 152 -0.5 | -1.75 0.2 | 0.41 -1.8 | 1.9 | 1.3 | 14.48 Δ: -0.04 | S15°: | 26 -2 | 12 -0.6 | |
| | 15 | 141 -1.6 | -1.25 0.2 | 0.52 -1.2 | 2 | | | S45°: | 30 -4 | 11.3 -2.2 | |
| | 25 | 108 -1.9 | -1.12 0.4 | -0.85 0.0 | 2 | | | S75°: | 24 0 | 10.7 -1.9 | |
| | 45 | 60.6 -0.4 | -0.96 0.3 | -1.98 0.3 | 0.7 | | | | | | G: 6.23 |
| | 75 | 37.9 -0.2 | -1.04 0.2 | -2.81 0.6 | 0.6 | | | | | | ΔG: -1.1 |
| | 110 | 31.8 -0.8 | -1.38 0.3 | -3.52 0.2 | 0.9 | | | | | | |
| Comparative Example 8 (absolute) and Example 9 match "Iridium Silver" (Mercedes) (difference) | -15 | 143 -2.0 | -0.87 0.1 | 0.42 -1.9 | 2.8 | 1.4 | 12.20 Δ: -0.26 | S15°: | 23 0.6 | 10.8 -1.3 | |
| | 15 | 133 -1.4 | -0.6 0.1 | 0.44 -1.1 | 1.8 | | | S45°: | 27 -3 | 8.3 -0.05 | |
| | 25 | 104 -1.4 | -0.78 0.0 | -0.61 0.4 | 1.5 | | | S75°: | 21 0 | 8.0 -1.1 | |
| | 45 | 62.7 -0.2 | -1.21 -0.1 | -1.39 0.7 | 0.7 | | | | | | G: 5.79 |
| | 75 | 42.3 0.5 | -1.41 -0.2 | -2.3 0.4 | 0.7 | | | | | | ΔG: -0.7 |
| | 110 | 36.7 0.7 | -1.74 -0.3 | -3.65 -0.2 | 0.8 | | | | | | |
| Comparative Example 9 (absolute) and Example 10 match "Glacier Silver" (BMW) (difference) | -15 | 113 2.7 | -1.95 -0.4 | -0.1 -2.0 | 3.4 | 1.3 | 8.48 Δ: 0.19 | S15°: | 15 6.2 | 5.5 4.1 | |
| | 15 | 107 2.1 | -1.62 -0.4 | -0.05 -1.4 | 2.5 | | | S45°: | 19 -1 | 4.3 0.9 | |
| | 25 | 92.1 0.2 | -1.57 0.0 | -0.74 -0.1 | 0.2 | | | S75°: | 16 -2 | 4.5 -0.2 | |
| | 45 | 65 -0.3 | -1.48 0.0 | -1.25 0.5 | 0.6 | | | | | | G: 4.85 |
| | 75 | 45.5 0.4 | -1.52 0.0 | -1.38 0.2 | 0.4 | | | | | | ΔG: -0.52 |
| | 110 | 36 0.9 | -1.65 -0.1 | -1.4 -0.3 | 0.9 | | | | | | |
| Comparative Example 9 (absolute) and Comparative Example 11 match | -15 | 113 9.99 | -1.95 -0.4 | -0.1 -0.94 | 10.0 | 5.1 | 8.48 Δ: 0.88 | S15°: | 15 -5.58 | 5.5 -1.43 | |
| | 15 | 107 8.87 | -1.62 -0.05 | -0.05 -0.82 | 8.9 | | | S45°: | 19 -3.01 | 4.3 -0.53 | |
| | 25 | 92.1 5.51 | -1.57 0 | -0.74 -0.56 | 5.5 | | | S75°: | 16 -3.14 | 4.5 -0.61 | |

TABLE 5-continued

Results of Color and Effect Measurements:

| | | Color measurements with BYK-Mac | | | | | | Effect measurements with BYK-Mac | | | |
|---|---|---|---|---|---|---|---|---|---|---|---|
| | Angle of | | | | | | | | | | |
| Sample: | Observation [°] | L* ΔL* | a* Δa* | b* Δb* | ΔE* | ΔE*$_{mean}$ | Flop ΔFlop | Angle: | $S_a$ Δ$S_a$ | $S_i$ Δ$S_i$ | G ΔG |
| "Glacier Silver" (BMW) (difference) | 45 | 65 0.87 | −1.48 −0.17 | −1.25 −0.76 | 1.2 | | | | | | G: 4.85 ΔG: −1.07 |
| | 75 | 45.5 0.09 | −1.52 −0.26 | −1.38 −1.64 | 1.7 | | | | | | |
| | 110 | 36 1.4 | −1.65 −0.41 | −1.4 −2.76 | 3.1 | | | | | | |

Discussion:

When the results for Example 10 and Comp. Example 11 are compared a strong increase of the lightness (ΔL*$_{-15}$° and ΔL*$_{15}$° and ΔL*$_{25}$° values) of Comparative Example is denoted. This is due to the increased amount of the conventional pearlescent pigment (Symic OEM Superfine Silver). This pearlescent pigment is lighter than Symic OEM Medium Opaque Silver, which has an ilmenite layer causing stronger absorption. This difference of the lightness is the main reason for the very high ΔE*- and ΔE*mean-values of Comp. Example 11. All Examples using the ilmenite containing pearlescent pigment had much lower ΔE*- and ΔE*mean-values.

All the Examples 7 to 9 yielded matches with very small, acceptable differences in the lightness, (ΔL*$_{-15}$° and ΔL*$_{15}$° and ΔL*$_{25}$° values), ΔE*-, Δflop- and ΔG-values. Such small differences can only be obtained when a pearlescent pigment with metallic character but absorbing properties (here: an ilmenite layer) are used.

The invention claimed is:

1. An effect pigment mixture comprising a silvery pearlescent pigment and platelet-like aluminum effect pigment, the aluminum effect pigment obtained by grinding of one or more of aluminum shot or aluminum based alloy shot, wherein the silvery pearlescent pigment comprises any one or more of:
   a) a pearlescent pigment comprising a transparent substrate coated with a high-refractive index layer having n>1.8 and comprising an iron-oxide including Fe(II)-ions,
   b1) a pearlescent pigment comprising a transparent substrate coated with a high-refractive index layer having n>1.8 and comprising a titanium suboxide,
   b2) a pearlescent pigment comprising a substrate including a high-refractive index layer having n>1.8 and comprising a titanium suboxide that is optionally coated with a high-refractive index layer having n>1.8,
   c) a pearlescent pigment comprising a transparent substrate coated with a high-refractive index layer having n>1.8 and comprising a titanium oxynitride,
   d) a pearlescent pigment comprising a transparent substrate coated with a layer comprising carbon, wherein the carbon is enclosed in a particulate form in another metal oxide layer or is formed as a separate, individual layer,
   e) a pearlescent pigment comprising a transparent substrate coated with a first layer comprising a mixture of oxides of titanium, iron and at least one of cobalt and chromium and a second layer on the first layer, wherein the second layer comprises an oxide of titanium, and
   f) a pearlescent pigment comprising any one of the coating layers mentioned in the pearlescent pigments a) to e), wherein the weight ratio of the pearlescent pigment to the aluminum effect pigment is in a range of 0.4 to 5.0;

wherein the platelet-like aluminum effect pigment is coated with an anticorrosive coating comprising adsorbed additives based on one or more of a phosphonic acid or a phosphoric ester.

2. The effect pigment mixture according to claim 1, wherein the platelet-like aluminum effect pigment has a d$_{50}$ ranging from 9 to 30 μm.

3. The effect pigment mixture according to claim 1, wherein the platelet-like aluminum effect pigment has a d$_{50}$ ranging from 9 to 12 μm.

4. The effect pigment mixture according to claim 1, wherein the platelet-like aluminum effect pigment has a mean thickness h$_m$ ranging from 80 to 500 nm.

5. The effect pigment mixture according to claim 1, wherein the platelet-like aluminum effect pigment has a mean thickness h$_m$ ranging from 80 to 400 nm.

6. The effect pigment mixture according to claim 1, wherein the platelet-like aluminum effect pigment comprises a mixture of finer and of coarser metallic effect pigments, wherein the finer aluminum effect pigments have a d$_{50}$ ranging from 9 to 13 μm and the coarser aluminum effect pigments have a d$_{50}$ ranging from 18 to 26 μm.

7. The effect pigment mixture according to claim 1, wherein the chroma C*$_{15°}$ of a drawdown of the silvery pearlescent pigment incorporated in a colorless lacquer and measured on black background is 15, wherein the pigmentation of the pearlescent pigment height is 10 wt.-% using a 100 μm doctor blade.

8. The effect pigment mixture according to claim 1, wherein the chroma C*$_{15°}$ of a drawdown of the silvery pearlescent pigment incorporated in a colorless lacquer and measured on black background is 15, wherein the pigmentation of the pearlescent pigment height is 10 wt.-% using a 100 μm doctor blade and wherein the platelet-like aluminum effect pigment has a d$_{50}$ ranging from 9 to 12 μm.

9. The effect pigment mixture according to claim 1, wherein hiding power of the silvery pearlescent pigment as defined by the ratio of the L*$_{75°,black}$/L*$_{75°,white}$-values measured on a black to white background, respectively, is higher than 70%, wherein a drawdown is made from the pearlescent pigment incorporated in a colorless lacquer and applied on a black/white contrast cartoon using a 100 μm doctor blade, wherein the pigmentation of the pearlescent pigment height is 10 wt.-%.

10. The effect pigment mixture according to claim 1, wherein hiding power of the silvery pearlescent pigment as defined by the ratio of the L*$_{75°,black}$/L*$_{75°,white}$-values measured on a black to white background, respectively, is higher than 70%, wherein a drawdown is made from the pearlescent pigment incorporated in a colorless lacquer and applied on a black/white contrast cartoon using a 100 μm doctor blade, wherein the pigmentation of the pearlescent pigment height is 10 wt.-% and wherein the platelet-like aluminum effect pigment has a $d_{50}$ ranging from 9 to 12 µm.

11. A coating formulation comprising
a binder, and
an effect pigment mixture, the effect pigment mixture comprising:
a silvery pearlescent pigment and platelet-like aluminum effect pigment, the aluminum effect pigment obtained by grinding of one or more of aluminum shot or aluminum based alloy shot, wherein the silvery pearlescent pigment comprises any one or more of:
a) a pearlescent pigment comprising a transparent substrate coated with a high-refractive index layer having n>1.8 and comprising an iron-oxide including Fe(II)-ions,
b1) a pearlescent pigment comprising a transparent substrate coated with a high-refractive index layer having n>1.8 and comprising a titanium suboxide,
b2) a pearlescent pigment comprising a substrate including a high-refractive index layer having n>1.8 and comprising a titanium suboxide that is optionally coated with a high-refractive index layer having n>1.8,
c) a pearlescent pigment comprising a transparent substrate coated with a high-refractive index layer having n>1.8 and comprising a titanium oxynitride,
d) a pearlescent pigment comprising a transparent substrate coated with a layer comprising carbon, wherein the carbon is enclosed in a particulate form in another metal oxide layer or is formed as a separate, individual layer,
e) a pearlescent pigment comprising a transparent substrate coated with a first layer comprising a mixture of oxides of titanium, iron and at least one of cobalt and chromium and a second layer on the first layer, wherein the second layer comprises an oxide of titanium, and
f) a pearlescent pigment comprising any one of the coating layers mentioned in the pearlescent pigments a) to e),
wherein the weight ratio of the pearlescent pigment to the aluminum effect pigment is in a range of 0.4 to 5.0;
wherein the platelet-like aluminum effect pigment is coated with an anticorrosive coating comprising adsorbed additives based on one or more of a phosphonic acid and a phosphoric ester.

12. The coating formulation according to claim 11, wherein the coating formulation further contains a solvent or a solvent mixture, and one or more additives.

13. The coating formulation according to claim 11, further comprising an additional pearlescent pigment comprising a transparent substrate and one or more color contributing layers including one or two high-refractive index layers including one or more of $TiO_2$ and $Fe_2O_3$.

14. The coating formulation according to claim 13, wherein the additional pearlescent pigment further comprises one or more low refractive layers having n<1.8.

15. An effect pigment mixture comprising a silvery pearlescent pigment and platelet-like aluminum effect pigment, the aluminum effect pigment obtained by grinding of one or more of aluminum shot or aluminum based alloy shot, wherein the silvery pearlescent pigment comprises any one or more of:
a) a pearlescent pigment comprising a transparent substrate coated with a high-refractive index layer having n>1.8 and comprising an iron-oxide including Fe(II)-ions,
b1) a pearlescent pigment comprising a transparent substrate coated with a high-refractive index layer having n>1.8 and comprising a titanium suboxide,
b2) a pearlescent pigment comprising a substrate including a high-refractive index layer having n>1.8 and comprising a titanium suboxide that is optionally coated with a high-refractive index layer having n>1.8,
c) a pearlescent pigment comprising a transparent substrate coated with a high-refractive index layer having n>1.8 and comprising a titanium oxynitride,
d) a pearlescent pigment comprising a transparent substrate coated with a layer comprising carbon, wherein the carbon is enclosed in a particulate form in another metal oxide layer or is formed as a separate, individual layer,
e) a pearlescent pigment comprising a transparent substrate coated with a first layer comprising a mixture of oxides of titanium, iron and at least one of cobalt and chromium and a second layer on the first layer, wherein the second layer comprises an oxide of titanium, and
f) a pearlescent pigment comprising any one of the coating layers mentioned in the pearlescent pigments a) to e),
wherein the weight ratio of the pearlescent pigment to the aluminum effect pigment is in a range of 0.4 to 5.0;
wherein the platelet-like aluminum effect pigment is coated with an anticorrosive coating comprising a metal oxide further modified by an organofunctional silane, aluminate, titanate or zirconate.

* * * * *